United States Patent [19]

Friedel et al.

[11] Patent Number: 6,128,033
[45] Date of Patent: *Oct. 3, 2000

[54] AUDIOVISUAL COMMUNICATIONS TERMINAL APPARATUS FOR TELECONFERENCING AND METHOD

[75] Inventors: Seymour Abraham Friedel, Goffstown, N.H.; Herman Joseph Pieters, Miami, Fla.; Jack Andrew Pitman, II, Germantown, Mass.

[73] Assignee: AT&T Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/674,233

[22] Filed: Jun. 28, 1996

[51] Int. Cl.$^7$ .................................................. H04N 7/14

[52] U.S. Cl. ...................... 348/15; 379/93.21; 379/202

[58] Field of Search ........................... 379/93.05, 93.06, 379/93.07, 93.21, 93.33, 93.34, 100.12, 100.17, 202; 348/14, 15, 16, 17, 18, 19; 395/200.66, 200.34; 370/260, 264; 709/204

[56] References Cited

U.S. PATENT DOCUMENTS

| | | | |
|---|---|---|---|
| 4,348,554 | 9/1982 | Asmuth . | |
| 4,485,400 | 11/1984 | Lemelson et al. | 379/100.17 |
| 4,746,986 | 5/1988 | Tanigawa | 379/100.12 |
| 5,611,038 | 3/1997 | Shaw et al. | 348/390 |
| 5,689,553 | 11/1997 | Ahuja et al. | 379/202 |
| 5,802,281 | 9/1998 | Clapp et al. | 395/200.04 |

FOREIGN PATENT DOCUMENTS

WO 95/12281 5/1995 France ............................ H04N 7/14

OTHER PUBLICATIONS

Newton's Telecom Dictionary, 7th Edition, Apr. 1994, Flatiron Publishing, pp. 1123,1124,957, and 958.
PictureTel Brochure, PCS100/694/50K.
PictureTel Brochure, M–8000/894/20K.
PictureTel Brochure, S4000EX/894/25K.
PictureTel Brochure, S–1000/0594/25K.
AT&T Software Defined Network Brochure.
AT&T Brochure "Overview of Switched Digital International (SDI)".
"Videoconferening goes mobile", Mobile Computing, PC Week, Apr. 10, 1995, pp. 31–32.
"Desktop Video is Happening Now", Sprint Video Views, Fall Edition, 1994, vol. 2, No. 3.

*Primary Examiner*—Curtis A. Kuntz
*Assistant Examiner*—Melur Ramakrishnaiah
*Attorney, Agent, or Firm*—Oliff & Berridge, PLC

[57] ABSTRACT

An audiovisual communications terminal apparatus is adapted for interconnection to at least another audiovisual communications terminal apparatus by a communications medium to form an audiovisual teleconferencing network. The audiovisual communications terminal apparatus includes an interface device, producing and transmitting means and receiving and broadcasting means. The interface device is operative to condition input audiovisual signals received from the at least another audiovisual communications terminal apparatus and to condition output audiovisual signals for processing by the at least another audiovisual communication terminal apparatus. Conditioning occurs by using an available one of a digital video communications standard and an analog video communications standard. The producing and transmitting means produce the output audiovisual signals and transmit the produced output audiovisual signals through the interface device and into the communications medium. The receiving and broadcasting means receive the input audiovisual signals from the interface device and broadcast the received input audiovisual signals thereby creating an audiovisual teleconference between two users so that the users can both see and hear each other. A method of processing output audiovisual signals is also described.

14 Claims, 4 Drawing Sheets

AUDIOVISUAL COMMUNICATIONS TERMINAL APPARATUS FOR TELECONFERENCING AND METHOD

BACKGROUND OF THE INVENTION

1. Field of the Invention

The present invention relates to an audiovisual communications terminal apparatus which is adapted for use to conduct an audiovisual teleconference. More particularly, the present invention is directed to an audiovisual communications terminal apparatus which is adapted for interconnection with at least another audiovisual communications terminal apparatus by a communications medium to form a teleconferencing network so that the teleconferencing users can both see and hear each other.

2. Description of Related Art

The public's desire to communicate is exemplified by the proliferation of telephone service since the invention of the telephone by Alexander Graham Bell. For decades, the public has been able to effectively communicate with one another through inexpensive use of the telephone system. In response to the public's desire for enhanced telephone service, several companies have developed audiovisual telephone services so that two or more parties can conduct an audiovisual teleconference.

One type of service developed by AT&T provides a telephone with a video monitor. Typically, this video telephone is installed in a variety of public locations. This service, however, is not widely available and it is, therefore, inconvenient for customers to use.

AT&T developed a "picture" telephone for its customers. The picture portion of this telephone service, of course, could only be used by the calling party if the called party also had a "picture" telephone. The pictures are transmitted between the "picture" telephones through conventional telephone lines on a H.324 analog video communications standard. This results in the sending "picture" telephone producing three to five video frames per second to the receiving "picture" telephone. Three to five framesper second displayed on the video monitor does not produce a continuous picture as provided, for example, by a television. In fact, the picture on the picture monitor appears to be depicted in short intervals producing an old fashion "nickelodeon" effect. This is irritating to a viewer because the viewer is conditioned to viewing a continuous motion picture. In comparison, a television depicts thirty frames of pictures per second which results in a continuous, albeit perceived, true motion picture. Because of these drawbacks, the "picture" telephone is not widely adopted by the general public.

A desktop video system has made it possible for private individuals to participate in audiovisual teleconferencing. However, the products and services associated with private audiovisual teleconferencing requires service fees and an investment in equipment that substantially exceed the cost of ordinary telephone services. Thus, desktop video systems are not attractive to the consumer who would only be a casual or incidental user of it.

Also, several companies provide audiovisual teleconferencing services primarily to businesses. The cost for audiovisual teleconferencing services for businesses is high. However, such cost is justified when considering the cost of travel, time value of the business person and other expenses incurred while away from the office. Therefore, although there is a demand for audiovisual teleconferencing services in businesses, terminal equipment for this purpose remains concentrated in a relatively small business market.

There is a need in the marketplace to provide a lowcost audiovisual teleconferencing network for private individuals. It would be advantageous if the audiovisual communications terminal apparatus can be used with a H.320 or a H.323 digital video communications standard and a H.324 analog video communications standard. There is also a need in the industry to provide high quality teleconferencing video service, particularly as compared to prior "picture" telephones. It would be advantageous if the audiovisual communications terminal apparatus could be portable so that it could be used in the home as well as for business.

SUMMARY OF THE INVENTION

It is an object of the present invention to provide an audiovisual communications terminal apparatus which can be interconnected by a conventional communications medium to another one or a compatible one of the audiovisual communications terminal apparatus to facilitate audiovisual teleconferencing between a plurality of parties.

It is another object of the present invention to provide a low-cost audiovisual communications terminal apparatus which can be used simply and easily in a user's home or at the user's place of business.

It is yet another object of the present invention to provide an audiovisual communications terminal apparatus that is lightweight and portable.

Still another object of the present invention is to provide an audiovisual communications terminal apparatus that provides high quality video sufficient to produce a continuous motion picture as perceived by the user.

Accordingly, an audiovisual communications terminal apparatus of the present invention is hereinafter described. The audiovisual communications terminal apparatus of the present invention is used with at least another audiovisual communications terminal apparatus interconnected to each other by a communications medium to form a teleconferencing network. In its broadest form, the audiovisual communications terminal apparatus of the present invention includes an interface device, means for producing and transmitting output audiovisual signals and means for receiving and broadcasting input audiovisual signals.

The interface device is operative to condition input audiovisual signals received from the at least another audiovisual communications terminal apparatus and to condition output audiovisual signals for processing by the at least another audiovisual communication terminal apparatus. At least the output audiovisual signals are conditioned by using either a digital video communications standard or a analog video communication standard, whichever is available. Preferably, the interface device is a modem device and a terminal adaptor device, both of which condition output and input audiovisual signals.

The producing and transmitting means produces the output audiovisual signals and transmits the produced output audiovisual signals through the interface device and into the communications medium. The receiving and broadcasting means receives the input audiovisual signals from the interface device and broadcasts the received input audiovisual signals.

An alternate embodiment of the present invention is a method of processing output audiovisual signals for transmission over a communications medium to consummate an audiovisual teleconference. In its broadest form, the method of the present invention includes a first step of conditioning the output audiovisual signals by using a digital video communications standard when available. The next step, when the digital video communications standard is unavailable, is using an analog video communications standard. Before the step of conditioning the output audiovisual signals, it is preferred to exercise a step of automatically determining if the digital video communications standard is available. When the automatic determination step determines that the digital communications standard is unavailable, the method of the present invention includes a step of automatically switching to the analog video communications standard.

BRIEF DESCRIPTION OF THE DRAWINGS

These and other objects of the present invention will be readily appreciated and understood from a consideration of the following detailed description of the embodiments of the present invention when taken together with the accompanying drawings, in which.

DETAILED DESCRIPTION OF PREFERRED EMBODIMENTS

An audiovisual communications terminal apparatus of the present invention is adapted for interconnection to at least another audiovisual communications terminal apparatus by a communications medium in order to form an audiovisual teleconferencing network. One of ordinary skill in the art would appreciate that the at least another audiovisual communications terminal apparatus can be, for example, the audiovisual communications terminal apparatus of the present invention or some other compatible audiovisual communications terminal apparatus such as the one described in a U.S. patent application Ser. No. 08/448,239 filed on May 23, 1995. Thus, the audiovisual teleconferencing network can be a plurality of audiovisual communication terminals of the present invention used by themselves or in combination with other conventional yet compatible audiovisual communication terminals. Furthermore, although the audiovisual communications terminal apparatus includes conventional components such as a television and a video cassette recorder, which are typically readily available in a person's home, selected other components of the audiovisual communications terminal apparatus of the present invention could be integrated into a single unit which is described below as a set-top box.

Figure 1:
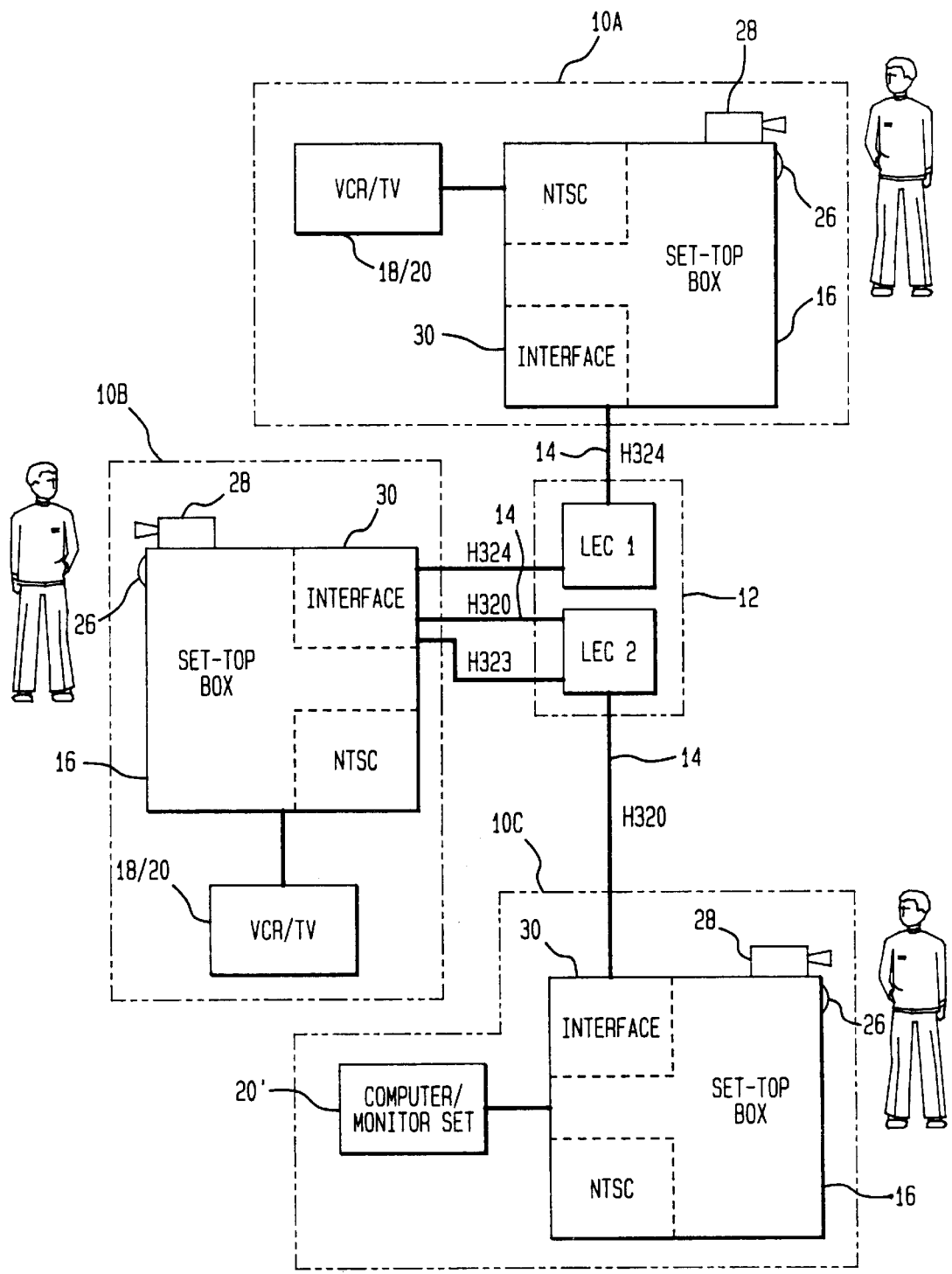
FIG. 1 is a block diagram of an audiovisual communications terminal apparatus of the present invention interconnected to at least another audiovisual communications terminal apparatus by a communications medium to form an audiovisual teleconferencing network.
Figure 2:
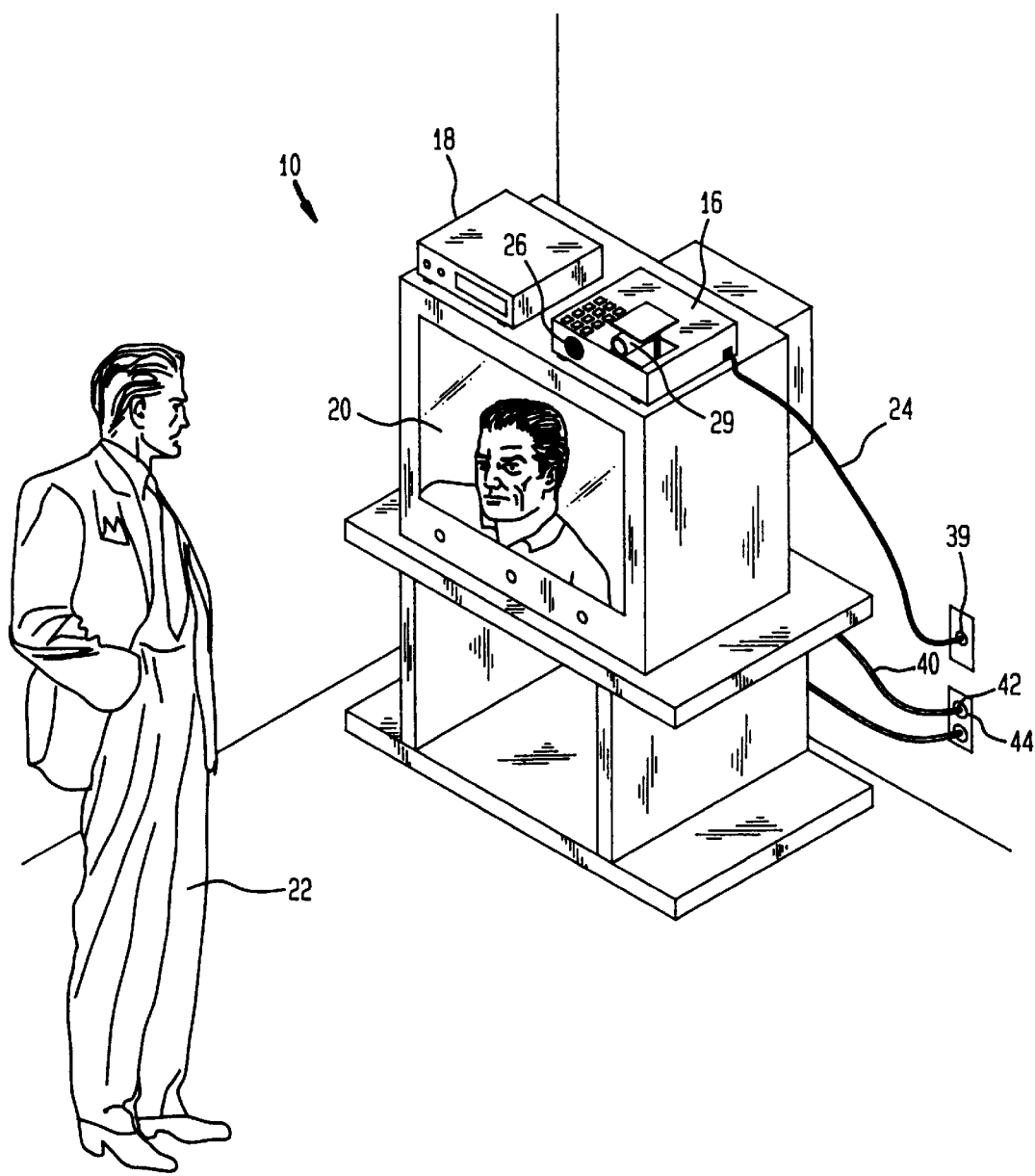
FIG. 2 is a perspective view of the audiovisual communication terminal apparatus including a set-top box, a television and a video cassette recorder with the set-top box connected to a telephone line system and illustrating two parties engaged in an audiovisual teleconference.

An audiovisual communications terminal apparatus 10 of the present invention is generally introduced in FIGS. 1 and 2. With reference to FIG. 1, three audiovisual communications terminal apparatuses 10A, 10B and 10C are connected to each other by a communications medium 12 to form an audiovisual teleconferencing network. As is well known in the art, the communications medium 12 includes a plurality of local exchange carriers represented by LEC1 and LEC2. LEC1 and LEC2 provide the communication lines 14 to interconnect the audiovisual communications terminal apparatuses 10A, 10B and 10C to each other. A skilled artisan would appreciate that FIG. 1 is used for illustration purposes only and would appreciate that the communications medium 12 can be an analog telephone line system, a digital telephone line system, a microwave telecommunication system, an ISDN system, a cable television line system, a satellite network system and possibly combinations of these or other systems.

Figure 3:
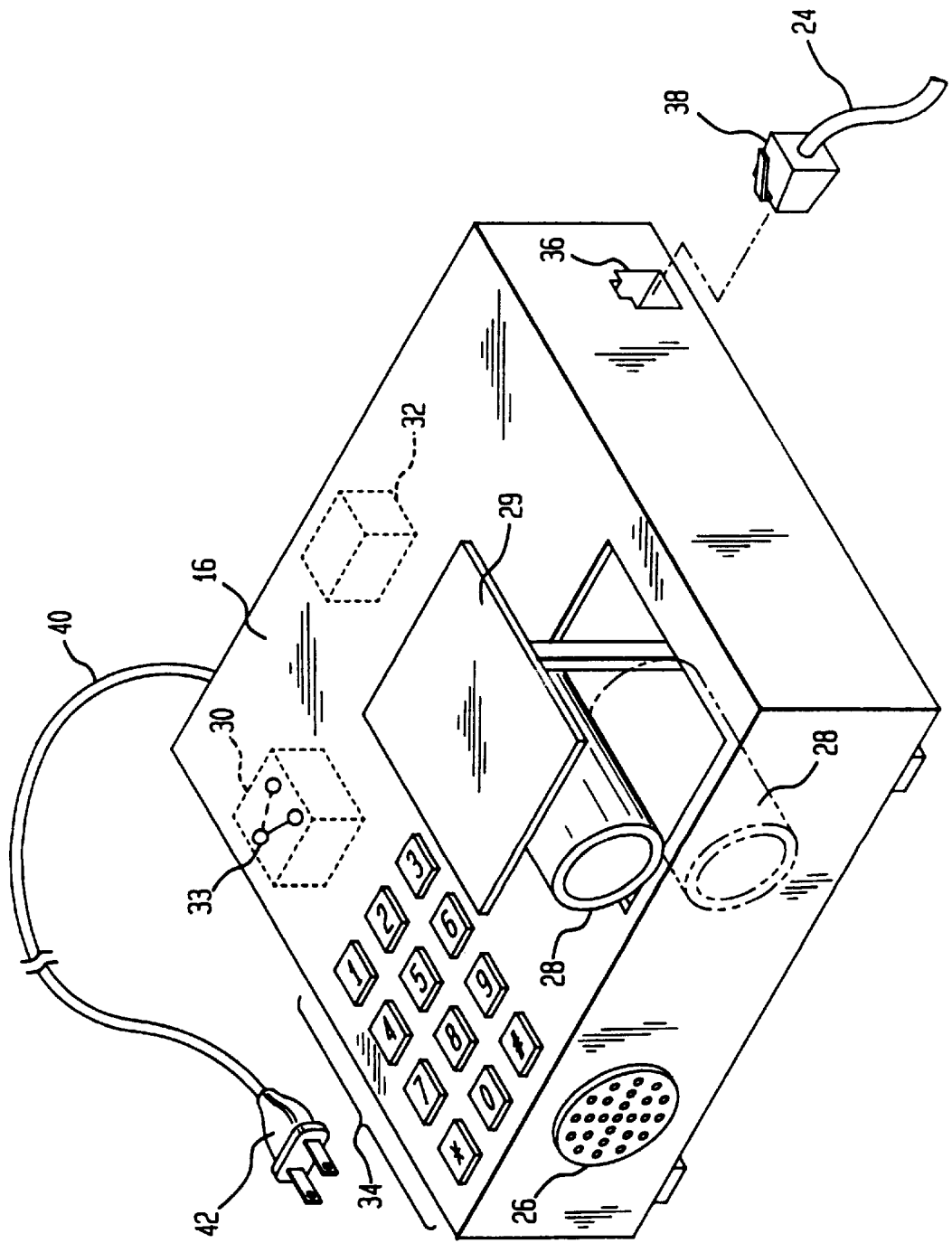
FIG. 3 is a perspective view of the set-top box shown in FIG. 2 with a camera disposed in an extended state and the camera drawn in phantom and disposed in a stowed state.

As shown in FIGS. 1–3, the audiovisual communications terminal apparatus 10 (or 10A, 10B and 10C in FIG. 1) includes a set-top box 16, a video cassette recorder 18 and a television 20. However, the video cassette recorder and the television 20 are simply means for receiving input audiovisual signals and broadcasting the received input audiovisual signals that are understandable to a user 22 as shown in FIG. 2. Receiving input audiovisual signals and then broadcasting the received input audiovisual signals are well known in the art, and, therefore, no further discussion is deemed necessary for one of ordinary skill in the art. It should be understood that any other type of receiving and broadcasting means can be used in lieu of the video cassette recorder and television such as a computer and monitor set 20' in FIG. 1 as a component of, for example, audiovisual communications terminal apparatus 10C. The set-top box 16 is connected to the communications medium 12 via a telephone line 24 that connects into a standard telephone wall outlet 26. Although not by way of limitation, the set-top box 16 is typically connected to the video cassette recorder 18 which, in turn, is connected to the television 20. With this arrangement, an audiovisual teleconference can be either broadcasted immediately to the user 22, recorded or both depending upon the desires of the user 22.

With reference to FIG. 3, the set-top box 16 may include a housing that contains a microphone 26 and a video camera 28. The microphone 26 and the camera 28 are means for producing output audiovisual signals as is well known in the art. The camera 28 is movable in and out of the set-top box 16 between an extended state and a stowed state. In the stowed state, the camera 28 is contained within the housing of the set-top box 16, as shown by the phantomly-drawn camera 28. In the extended state, the camera 28 projects from the set-top box 16 so that it can produce, in combination with the microphone 26, output audiovisual signals. A lid 29 is associated with the camera 28 and moves in conjunction with the camera 28 as it moves between the stowed state and the extended state. When the camera 28 is in the stowed state, the lid 29 prevents dust and debris from entering into the set-top box 16. The set-top box 16 also contains an interface device 30 and a composite video signal device 32 which are components of the receiving and broadcasting means.

Figure 5:
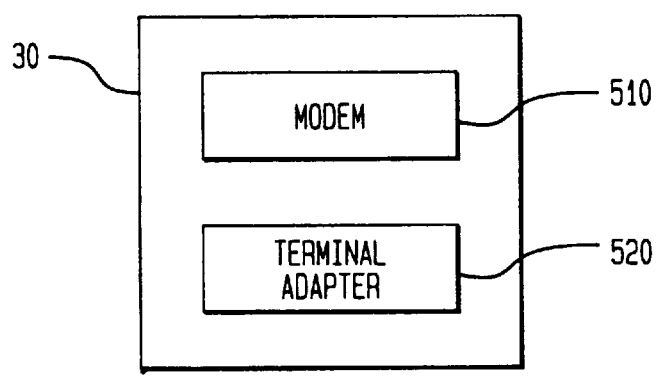
FIG. 5 is a block diagram representing an interface device of the present invention.

Interface device 30 is operative to condition input audiovisual signals received from another audiovisual communications terminal apparatus as well as to condition output audiovisual signals for processing by the other audiovisual communications terminal apparatus by using an available one of a H.320 digital video communications standard, a H.323 digital video communications standard or a H.324 analog video communications standard. As best shown in FIG. 1, the audiovisual communications terminal apparatus 10A and 10B are interconnected to each other through the communication lines 14 from LEC1 using the H.324 analog video communications standard. Also, for illustration purposes, the audiovisual communications terminal apparatus 10B is interconnected to the audiovisual communications terminal apparatus 10C through the communication lines 14 of LEC2 using the H.320 digital video communications standard. Preferably, the interface device 30 is a modem device 510 and a terminal adaptor device 520 as represented in FIG. 5. As is commonly known in the art, the modem device conditions analog output and input audiovisual signals and the terminal adaptor device conditions digital output and input audiovisual signals. For the audiovisual communication terminal apparatus 10 of the present invention, the modem device 510 operates to condition respective ones of the output and input audiovisual signals at a rate of at least 9.6 kilobits per second. This rate of kilobits per second could generate a video signal for either or both of the video cassette recorder 18 and the television 20 of at least 7 video frames per second. Generating 7 video frames per second provides a perceived, continuous motion picture that is familiar to the user. The terminal adaptor device 520 operates to condition respective ones of the output and input audiovisual signals at a rate of at least 28.8 kilobits per second. This rate of kilobits per second could generate a video signal of at least 10 video frames per second.

It is preferred that the interface device 30 uses the H.320 digital video communications standard, if available. However, a skilled artisan would appreciate that a H.323 video communications standard could also be used, for application with an ethernet. If the H.320 digital video communications standard is unavailable then the interface device 30 can use the H.324 analog video communication standard which is typical of a conventional telephone line system. Therefore, the interface device 30 includes an automatic switching element 33 so that when the H.320 digital video communications standard is unavailable, the interface device 30 can automatically switch to the H.324 analog video communication standard. However, it would be possible that the interface device 30 includes a manual switching element. In either event, it is preferred that switching element 33 is biased to the H.320 digital video communications standard because it provides a better quality motion picture than the H.324 analog video communications standard.

Once the output audiovisual signals are produced by the microphone 26 and the camera 28, the produced output audiovisual signals are transmitted through the interface device 30 and into the communications medium 12 via the telephone line 24 to the other audiovisual communications terminal apparatus for broadcasting the same. Correspondingly, the other audiovisual communications terminal apparatus produces and transmits output audiovisual signals which become audiovisual input signals to the audiovisual communications apparatus 10 of the present invention which are first received by the interface device 30. The video cassette recorder 18 and/or the television 20 then receive the input audiovisual signals from interface device 30 so that the received input audiovisual signals can be broadcasted and/or recorded for later broadcasting. The composite video signal device 32 is interconnected between the interface device 30 and the video cassette recorder 18. However, it should be understood that the composite video signal device 32 can be directly connected to the television 20 or the computer and monitor set 20', if desired. It is preferred that the composite video signal device 32 conforms to a NTSC standard. However, one of ordinary skill in the art would appreciate that the composite video device 32 can also conform to a PAL standard or other conventional standard.

As best shown in FIG. 3, the set-top box 16 may include a telephone dialing pad 34. As with a conventional telephone, the telephone dialing pad 34 is used to dial telephone numbers which are known to be connected to other audiovisual communication terminal apparatuses so that they can communicate with one another. One of ordinary skill in the art would appreciate that dialing telephone numbers could also be accomplished with a remote control unit. Thus, either the dialing pad 34, the remote control unit or both could be used for the present invention. The interface device 30 is connected to at least one telephone line connector 36 which is sized and adapted to receive a conventional RJ11 analog jack 38. Of course, the RJ11 analog jack 38 is connected to telephone wire 24. Another RJ11 analog jack is plugged into a telephone wall outlet 39. Power is supplied to the set-top box 16 through an electrical cord 40 having a plug 42. As shown in FIG. 2, the plug 42 can be inserted into any conventional household power supply through an electric socket 44.

Figure 4:
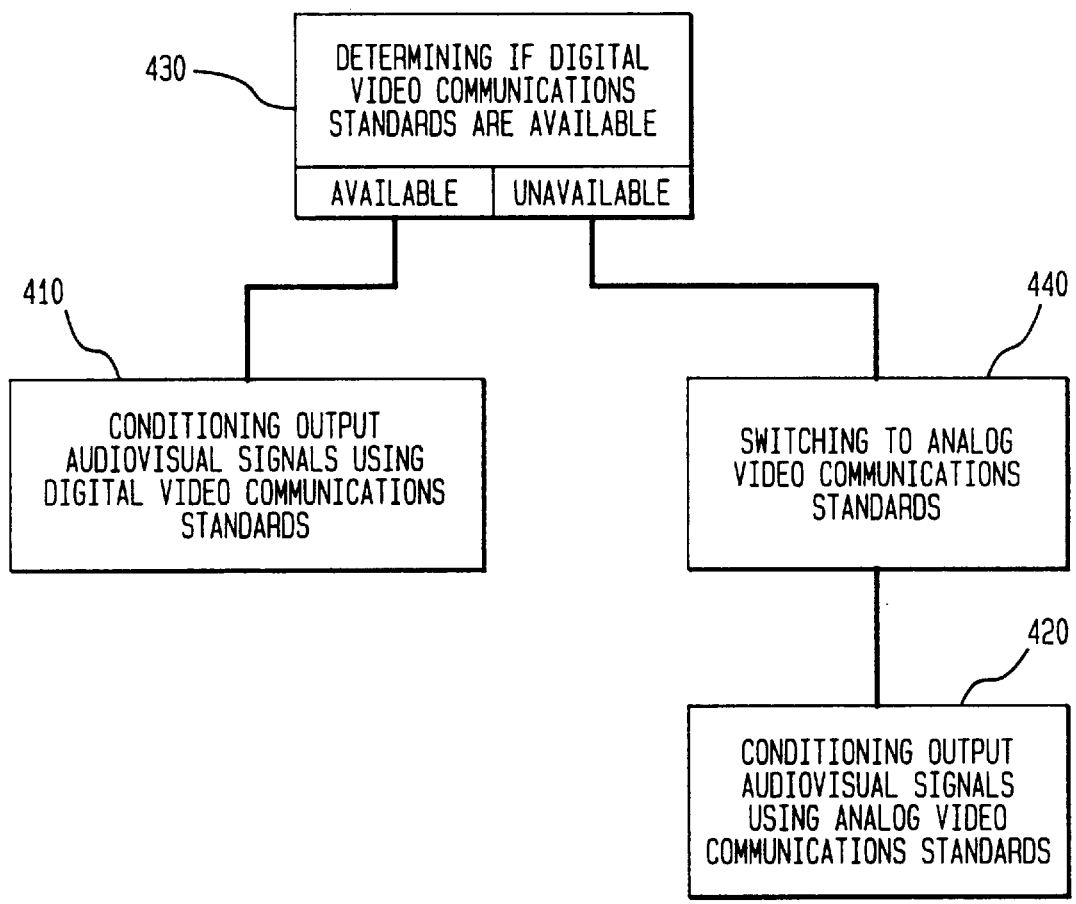
FIG. 4 is a block diagram illustrating a method of the present invention for processing output audiovisual signals.

Another embodiment of the present invention shown in FIG. 4 is a method of processing output audiovisual signals for transmission over the communications medium to consummate an audiovisual teleconference. One step of the method of the present invention is step 410 for conditioning the output audiovisual signals by using digital video communications standard when available. Preferably, the digital visual communication standard is H.320 as is known by a skilled artisan. Another step of the method of the present invention is step 420 for using an analog video communications standard when the digital video communications standard is unavailable. It is preferred that the analog audio communication standard is H.324, as is known by a skilled artisan. Preferably, the method of the present invention includes a step 430 for automatically determining if the digital video communications standard is available before the step of conditioning the output audiovisual signals. Further, when the automatic determination step determines that the digital communications standard is unavailable, the method of the present invention includes a step 440 for automatically switching to the analog video communications standard after the automatic determination step.

As stated above, the communication medium could be a cable television line system. However, the audiovisual communications terminal apparatus and method are different from a cable modem. The cable modem transmits and receives signals over two different media and at two different speeds. In contrast, the audiovisual communications terminal apparatus and method receive and transmit signals over one medium with the signals traveling in both directions over the one medium.

The video communications terminal apparatus and method can be enjoyed by many users for home use. The set-top box of the audiovisual communication terminal apparatus is portable and can be purchased at a relatively low cost. As described above, the set-top box is used in conjunction with conventional equipment such as televisions and video cassette recorders which are typically available in today's modern home. Having this equipment readily available contributes to the low cost of audiovisual teleconferencing among private individuals. As shown in FIG. 2, user 22 can engage in an audiovisual teleconference by simply interconnecting the set-top box between the television or video cassette recorder and the telephone wall outlet. Also, the low cost is partially attributable to the capability of using either the H.320 digital video communications standard, the H.323 video communications standard or the H.324 analog video communications standard, the one presently widely available to users. It is, however, preferable to use the H.320 digital video communications standard when available. In any event, high quality video, i.e., a perceived continuous motion picture, can be produced. Such high quality video has never heretofore been available for audiovisual teleconferencing for private home use.

The present invention has been described with particularity in connection with specific embodiments. It should be appreciated, however, that many changes may be made to the disclosed embodiments without departing from the inventive concepts as defined by the following claims.

What is claimed is:

1. An audiovisual communications terminal apparatus adapted for interconnection to at least another audiovisual communications terminal apparatus by a communications medium to form a teleconferencing network, said audiovisual communications terminal apparatus comprising:

an interface device operative to condition input audiovisual signals received from each other audiovisual communications terminal apparatus and to condition output audiovisual signals for processing by another audiovisual communications terminal apparatus, wherein the interface device can automatically select [to use] a digital video communications standard and an analog video communications standard; wherein the audiovisual communications terminal is simultaneously connected to a first other audiovisual communications terminal using an analog video communication standard and is connected to a second other audiovisual communications terminal using a digital video communications standard.

2. An audiovisual communications terminal apparatus according to claim 1, wherein said interface device includes whereby said modem and a terminal adaptor whereby said modem for conditioning digital output and input audiovisual signals.

3. An audiovisual communications terminal apparatus according to claim 2, wherein said terminal adaptor is operative to condition respective ones of the output and input audiovisual signals at a rate of at least 28.8 kilobits per second.

4. An audiovisual communications terminal apparatus according to claim 2, wherein said terminal adaptor is operative to condition respective ones of the output and input audiovisual signals at a rate of at least 10 video frames per second.

5. An audiovisual communications terminal apparatus according to claim 1, wherein said producing means includes a microphone and a video camera.

6. An audiovisual communications terminal apparatus according to claim 5, further comprising a housing sized and adapted to contain said microphone and said camera.

7. An audiovisual communications terminal apparatus according to claim 6, wherein said camera is operative to move between a stowed state whereby said camera is contained within said housing and an extended state whereby said camera projects from said housing.

8. An audiovisual communications terminal apparatus according to claim 5, wherein said housing is sized and adapted to include said interface device.

9. An audiovisual communications terminal apparatus according to claim 1, wherein said receiving and broadcasting means includes at least one of a television, a computer and monitor set and a video cassette recorder.

10. An audiovisual communications terminal apparatus according to claim 9, wherein said receiving and broadcasting means includes a composite video signal device interconnected between said interface device and said at least one of said television, said computer and monitor set and said video cassette recorder.

11. An audiovisual communications terminal apparatus according to claim 10, wherein said composite video signal device is operative to conform to one of a NTSC standard and a PAL standard.

12. An audiovisual communications terminal apparatus according to claim 1, wherein the communications medium is selected from a group including an analog telephone line system, a digital telephone system, a microwave telecommunications system, an ISDN system, a cable television line system and a satellite network system.

13. An audiovisual communications terminal apparatus according to claim 1, further comprising means for dialing telephone numbers.

14. An audiovisual communications terminal apparatus according to claim 13, wherein said interface device is connected to at least one telephone line for connecting said interface device to a telephone network.

* * * * *

UNITED STATES PATENT AND TRADEMARK OFFICE
CERTIFICATE OF CORRECTION

PATENT NO.     : 6,128,033
DATED          : October 3, 2000
INVENTOR(S)    : Seymour A. Friedel et al.

Page 1 of 1

It is certified that error appears in the above-identified patent and that said Letters Patent is hereby corrected as shown below:

Claim 1,
Line 11, delete "[to use]".

Claim 2.    An audiovisual communications terminal apparatus according to claim 1, wherein said interface device includes [whereby said modem and] a terminal adapter [whereby said modem] for conditioning digital output and input audiovisual signals.

Claim 5.    An audiovisual communications terminal apparatus according to claim 1, further comprising:
    means for producing output audiovisual signals for transmission through a communication medium, wherein said producing means includes a microphone and video camera.

Claim 9.    An audiovisual communications terminal apparatus according to claim 1, further comprising means for receiving input audiovisual signals from said interface device and for broadcasting the received input audiovisual signals, wherein said receiving and broadcasting means includes at least one of a television, a computer and monitor set and a video cassette recorder.

Signed and Sealed this

Thirteenth Day of November, 2001

Attest:

*Nicholas P. Godici*

NICHOLAS P. GODICI
*Attesting Officer*     *Acting Director of the United States Patent and Trademark Office*